No. 754,717. PATENTED MAR. 15, 1904.
S. C. SHOUP.
DOMESTIC BOILER.
APPLICATION FILED OCT. 17, 1903.
NO MODEL. 2 SHEETS—SHEET 1.
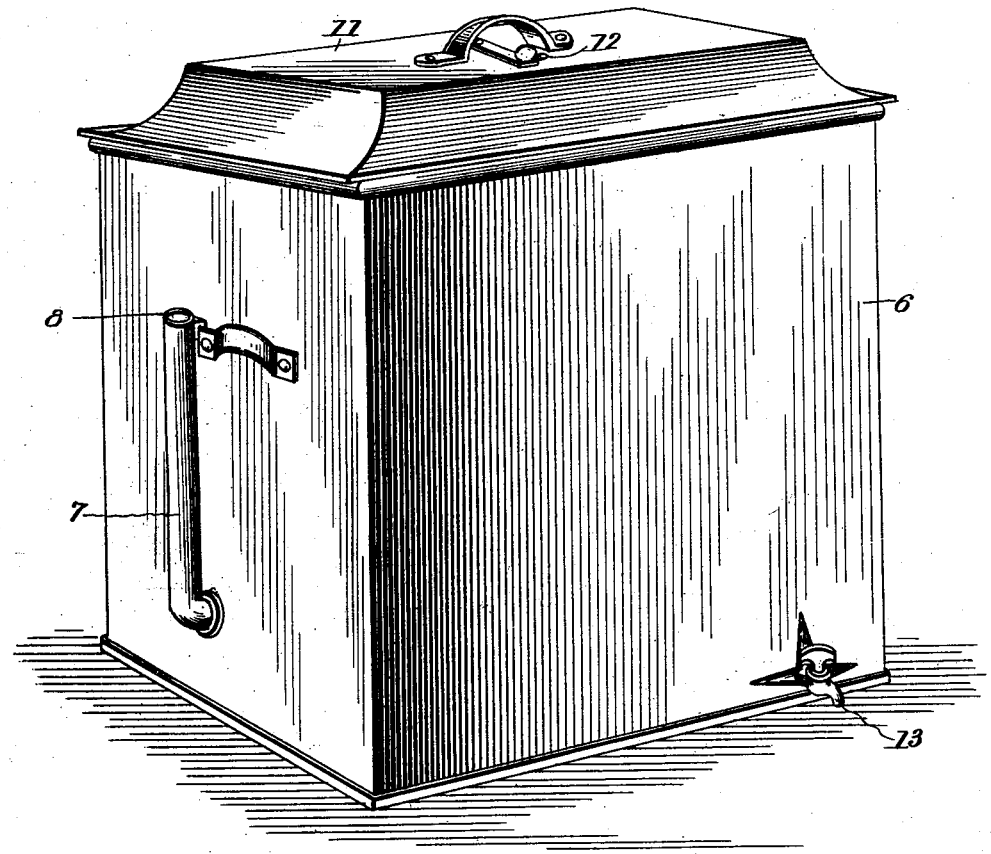
Fig. 1.
Fig. 4.
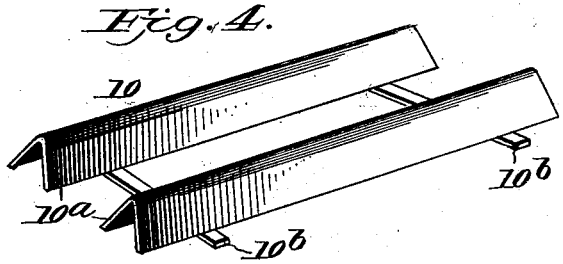
Witnesses
C. H. Walker
Geo. E. Few
Inventor
Saxton C. Shoup
By
Alco B. Stevens & Co
Attorneys No. 754,717. PATENTED MAR. 15, 1904.
S. C. SHOUP.
DOMESTIC BOILER.
APPLICATION FILED OCT. 17, 1903.
NO MODEL. 2 SHEETS—SHEET 2.
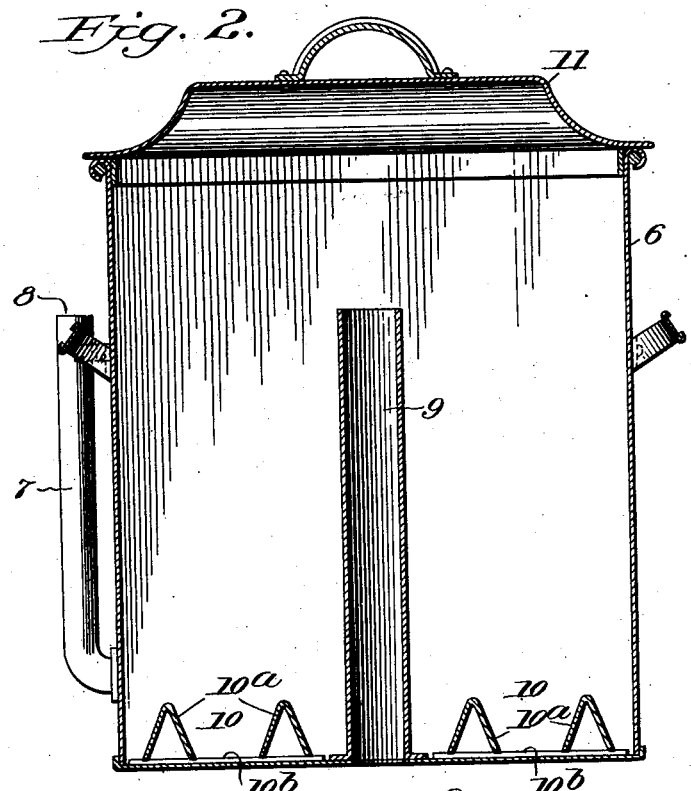
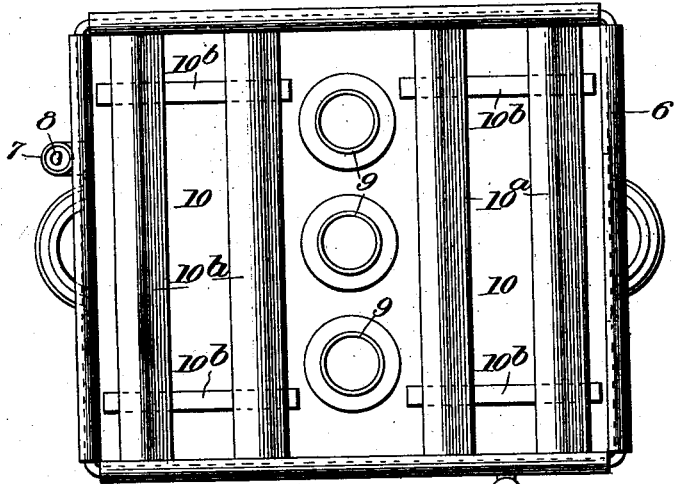

No. 754,717. Patented March 15, 1904.

UNITED STATES PATENT OFFICE.

SAXTON C. SHOUP, OF FOSTORIA, OHIO.

DOMESTIC BOILER.

SPECIFICATION forming part of Letters Patent No. 754,717, dated March 15, 1904.

Application filed October 17, 1903. Serial No. 177,463. (No model.)

*To all whom it may concern:*

Be it known that I, SAXTON C. SHOUP, a citizen of the United States, residing at Fostoria, in the county of Seneca and State of Ohio, have invented new and useful Improvements in Domestic Boilers, of which the following is a specification.

This invention relates particularly to a domestic boiler or apparatus for canning fruit, and has for its object to provide an apparatus in which fruit or the like may be cooked or pasteurized in the cans or jars in which it is to be preserved, thereby retaining all the flavor and quality of the fruit without the loss incident to open cooking as commonly practiced.

The object of the invention is to form an improved device for the purpose stated, characterized by improvements and novelty with respect to the construction, as more fully hereinafter described, and as illustrated in the accompanying drawings, in which—

Figure 1 is a perspective view of the device. Fig. 2 is a vertical section thereof. Fig. 3 is a top plan view with the cover removed, and Fig. 4 is a perspective view of a grating used to support the cans in the vessel.

Referring specifically to the drawings, 6 indicates a vessel which may be of any suitable size or shape and which is adapted to contain the cans of fruit and the water in which they are heated. The vessel has on the side thereof an outer tube 7, which opens at the bottom into the interior of the vessel and is open at the top to receive a thermometer, as shown at 8. The temperature of the water in the vessel may thus be ascertained by dipping the thermometer into the water, which rises in the tube. The top of the tube, it is perhaps needless to state, is higher than the maximum height of water used in the vessel.

Within the vessel and extending through the bottom thereof are a number of vertical tubes 9 open at both ends. These tubes are preferably disposed in a row across the middle of the vessel and are of a height sufficient to extend above the maximum height of water intended to be used in the vessel. The tubes serve to permit the heat to pass from the burner or stove below into the interior of the vessel, and thus assist in heating the water and in maintaining a heated condition in the air-space above the water.

At 10 trays are indicated upon which the cans rest when they are in the vessel. These trays are preferably formed of a number of parallel inverted-V-shaped strips $10^a$, the lower edges of which are secured to cross-bars $10^b$, which rest upon the bottom of the vessel. The trays are removable from the vessel. When in use, the sharp edges of the strips are presented to the cans, so that the water may come in contact with every part thereof.

A removable cover for the vessel is indicated at 11, and it has in the top thereof a valve 12, which may be opened to allow the escape of the hot air to reduce the temperature in case it gets too high. The vessel is also provided with a faucet 13 to draw off the water after use.

In operation the fruit is packed in the cans, which are then placed on the trays in the vessel, and sufficient cold water is then poured in to cover the body of the cans. The vessel is then set over a fire and brought to the required degree of heat—say 140°—to produce pasteurization and destroy the ferments, after which the cans may be taken out and set away to preserve.

What I claim as new, and desire to secure by Letters Patent, is—

A covered vessel of the kind stated, having a row of open tubes extending through the bottom thereof and upwardly within the same, a regulating-valve in the upper part of the vessel, to allow the escape of heated air therefrom and a removable tray on each side of the row within the vessel.

In testimony whereof I have signed my name to this specification in the presence of two subscribing witnesses.

SAXTON C. SHOUP.

Witnesses:
 JOHN R. BRADNER,
 JAS. P. MONROE.